United States Patent
Murai et al.

(10) Patent No.: US 7,471,343 B2
(45) Date of Patent: *Dec. 30, 2008

(54) IMAGE PROCESSING DEVICE, IMAGE PROCESSING METHOD, AND IMAGE PROCESSING PROGRAM

(75) Inventors: Kiyoaki Murai, Matsumoto (JP); Hidekuni Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1061 days.

This patent is subject to a terminal disclaimer.

(21) Appl. No.: 10/779,706

(22) Filed: Feb. 18, 2004

(65) Prior Publication Data

US 2004/0201782 A1    Oct. 14, 2004

(30) Foreign Application Priority Data

Mar. 14, 2003    (JP) ............................. 2003-070529

(51) Int. Cl.
*H04N 5/14*    (2006.01)
*G06K 9/40*    (2006.01)

(52) U.S. Cl. ...................................... 348/700; 382/274

(58) Field of Classification Search ............ 375/240.12, 375/240.14; 382/160, 168, 274; 348/699, 348/700

See application file for complete search history.

(56) References Cited

U.S. PATENT DOCUMENTS

| | | | |
|---|---|---|---|
| 4,694,329 A | | 9/1987 | Belmares-Sarabia et al. |
| 4,823,184 A | | 4/1989 | Belmares-Sarabia et al. |
| 5,239,378 A | | 8/1993 | Tsuji et al. |
| 5,241,386 A | | 8/1993 | Tsuji et al. |
| 5,978,029 A | * | 11/1999 | Boice et al. ............ 375/240.14 |
| 6,252,905 B1 | * | 6/2001 | Pokrinchak et al. .... 375/240.14 |
| 6,434,196 B1 | * | 8/2002 | Sethuraman et al. ... 375/240.12 |
| 7,113,648 B1 | * | 9/2006 | Aihara ...................... 382/274 |
| 2002/0031178 A1 | | 3/2002 | Isozaki |
| 2004/0001165 A1 | | 1/2004 | Shiota et al. |
| 2004/0247199 A1 | * | 12/2004 | Murai et al. ................ 382/274 |

FOREIGN PATENT DOCUMENTS

| | | |
|---|---|---|
| CN | 1531331 A | 9/2004 |
| EP | 0 501 728 A2 | 9/1992 |
| EP | 1 359 746 A1 | 11/2003 |
| JP | A 4-271669 | 9/1992 |
| JP | A 4-293365 | 10/1992 |

(Continued)

OTHER PUBLICATIONS

Hottter et al., M. "Detection of Moving Objects in Natural Scenes by a Stochastic Multi-Feature Analysis of Video Sequences", Advanced Development Communications; 1995.

*Primary Examiner*—Gims Philippe
(74) *Attorney, Agent, or Firm*—Oliff & Berridge, PLC

(57) ABSTRACT

The invention provides an image processing device that reduces flickering on a screen by simplifying the structure of an image processing device. The image processing device can include a statistical value calculating unit, a correction parameter calculating unit, and an image correcting unit. The statistical value calculating unit can generate statistical value data. The correction parameter calculating unit equalizes the statistical value data using the low pass filter whose time constant changes according to whether change occurs in the scene, thereby generating the correction parameter. A look-up table is generated based on the correction parameter.

8 Claims, 8 Drawing Sheets

FOREIGN PATENT DOCUMENTS

| | | |
|---|---|---|
| JP | B2 7-99862 | 10/1995 |
| JP | 08-153197 | 6/1996 |
| JP | B2 2972095 | 8/1999 |
| JP | A 2001-103338 | 4/2001 |
| JP | A 2001-343957 | 12/2001 |
| JP | A 2002-77723 | 3/2002 |
| JP | A 2002-142132 | 5/2002 |
| JP | A 2002-262303 | 9/2002 |
| JP | 2002-320111 | 10/2002 |
| JP | A 2002-369003 | 12/2002 |
| JP | 2003-304417 | 10/2003 |
| JP | 2003-309763 | 10/2003 |
| JP | 2004-007301 | 1/2004 |

* cited by examiner

F I G. 3
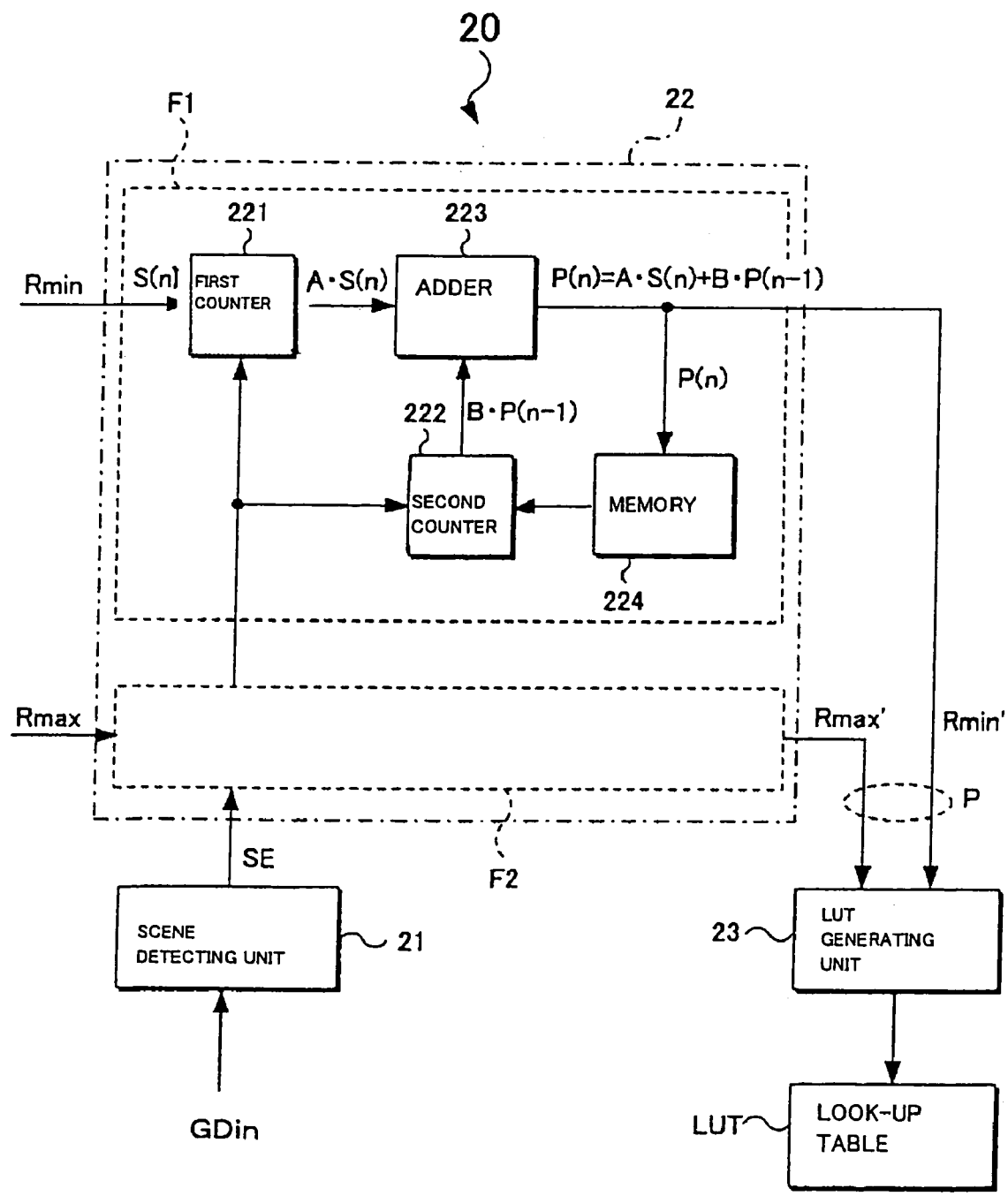

FIG. 8

| FRAME RATE | A | B |
|---|---|---|
| 30 fps OR MORE | 6/8 | 2/8 |
| 10~30fps | 5/8 | 3/8 |
| 10 fps OR LESS | 4/8 | 4/8 |

IMAGE PROCESSING DEVICE, IMAGE PROCESSING METHOD, AND IMAGE PROCESSING PROGRAM

BACKGROUND OF THE INVENTION

1. Field of Invention

The present invention relates to an image processing device for performing image correction processing on image data, an image processing method, and an image processing program.

2. Description of Related Art

In image processing, the characteristics of images on one screen may be statistically interpreted, thereby performing image correction processing on image data based on the interpretation result. As a statistical interpretation method, a method of obtaining the distribution (a histogram) of the frequencies of gray levels to calculate a correction parameter from the histogram is known.

In the case where the correction parameter significantly changes from frame to frame when moving images are processed, the contrast or the brightness of the entire screen may change thereby causing flickering of the images. Furthermore, when noise overlaps the image data, the image flickering is increased. In order to solve the above problem, a technology for increasing the time constant of changes in the distribution of the histogram by passing the data on the distribution of the histogram through a cyclic filter circuit when the histogram is generated, thereby preventing fluctuation of the corrected image data is known as provided, for example, in the Japanese Examined Patent Application Publication No. 7-99862 (see, for example, paragraph number 0018).

SUMMARY OF THE INVENTION

However, in the case of passing through a cyclic filter when generating a histogram, which is a source of statistical value calculations, there are problems in that the size of the circuit increases, thereby requiring a large amount of time for processing the data. In particular, in portable electronic apparatus, such as mobile telephones, a reduction in the size of circuits and an increase in the speed of processing data become a significant concern in view of the miniaturization of devices and a reduction in power consumption.

The invention takes into account the above-described problems. An object of the present invention is to provide an image processing apparatus having a simple structure, an image processing method, and an image processing program capable of reducing flickering on a screen.

In order to achieve the above object, an image processing device according to the present invention performs image processing on image data, and can include a statistical value calculating device for performing statistical processing on the image data to generate statistical value data representing statistical values, a scene detecting device for detecting whether a change occurs in a scene based on the image data, a correction parameter calculating device for weighting the statistical value data of a plurality of frames in accordance with the detection result by the scene detecting device to calculate a correction parameter, and image correcting device for performing image correction processing on the image data based on the correction parameter.

According to the present invention, it does not equalize the correction parameter during calculating the statistical values, such as a histogram or an accumulative histogram, but the statistical values are weighted after obtaining statistical values. In a process of generating the statistical values, since it is necessary to process image data in units of pixels, an operation circuit is large-scaled thereby increasing processing load. On the contrary, according to the present invention, since the correction parameter is equalized by weighting after obtaining the statistical values, it is possible to simplify the structure of the image processing device. Furthermore, since it is possible to change the weighting according to whether change occurs in the scene, it is possible to improve the response characteristics of the correction parameter for changes in images and thereby to display clean images when scenes change.

It is preferable that when it is detected by the scene detecting device that a change occurs in the scene, the correction parameter calculating device generates a correction parameter by performing calculations in which the weighting on statistical value data of a previous frame is smaller than in a case where no change occurs in the scene. When change occurs in the scene, since the continuity of the statistical values is lost, it is possible to improve the response characteristics of the correction parameter by reducing the weighting of the statistical value data in a previous frame.

Further, it is preferable that when it is detected by the scene detecting device that no change occurs in the scene, the correction parameter calculating device calculates the average of statistical value data of the plurality of frames to generate the correction parameter. In this case, since noise components included in the image data are removed, it is possible to effectively prevent the flickering on a screen.

It is preferable that when it is detected by the scene detecting device that a change occurs in the scene, the correction parameter calculating device generates statistical value data of the current frame as the correction parameter. Therefore, it is possible to improve the response characteristics.

It is preferable that when it is detected by the scene detecting device that no change occurs in the scene, the correction parameter calculating device calculates a correction parameter $P(n)$ of the current frame in accordance with the following equations: $P(n)=A*S(n)+B*P(n-1)$ and $1=A+B$, where $S(n)$ is statistical value data of the current frame, $P(n-1)$ is a correction parameter of the frame prior to the current frame by one frame, A is a first coefficient, and B is a second coefficient. In this case, it is possible to generate the correction parameter by a cyclic low pass filter.

It is preferable that when it is detected by the scene detecting device that a change occurs in the scene, the correction parameter calculating device makes A as 1 and B as 0. Therefore, it is possible to prevent statistical values before scenes change from affecting the correction parameter.

It is preferable that the correction parameter calculating device detect a frame rate of the image data and weights the statistical value data of the plurality of frames based on the detected frame rate and the detection result by the scene detecting device. In this case, since it is possible to determine the correction parameter in consideration of the frame rate, it is possible to appropriately correct images according to the density of a frame.

Further, an image processing method according to the present invention performs image processing on image data, and can include the steps of performing statistical processing on the image data to generate statistical value data representing statistical values, detecting whether a change occurs in a scene based on the image data, calculating a correction parameter by weighting the statistical value data of a plurality of frames in accordance with the result of detecting scenes, and performing image correction processing on the image data based on the correction parameter. According to the present invention, since the correction parameter is equalized by weighting after obtaining the statistical values, it is possible to simplify the structure of the image processing device.

It is preferable that in the step of calculating the correction parameter, when it is detected that change occurs in the scene, the correction parameter be generated by performing calculations in which the weighting on statistical value data of a previous frame is smaller than in a case where no change occurs in the scene. Therefore, it is possible to improve the response characteristics of the correction parameter for changes in images and thereby to display clean images when scenes change.

According to the present invention, an image processing program performs image processing on image data, and can make a computer function as: a statistical value calculating device for performing statistical processing on the image data to generate statistical value data representing statistical values, a scene detecting device for detecting whether a change occurs in a scene based on the image data, a correction parameter calculating device for weighting the statistical value data of a plurality of frames based on the detection result by the scene detecting device to calculate a correction parameter, and an image correcting device for performing image correction processing on the image data based on the correction parameter. According to the present invention, since the correction parameter is equalized by weighting after obtaining the statistical values, it is possible to significantly reduce the processing load.

BRIEF DESCRIPTION OF THE DRAWINGS

The invention will be described with reference to the accompanying drawings, wherein like numerals reference like elements, and wherein:

FIG. 3 is an exemplary block diagram illustrating the structure of a correction parameter calculating unit 20;

FIG. 8 illustrates a relationship between a frame rate and a first coefficient A and a second coefficient B in an image processing device according to a modification.

DETAILED DESCRIPTION OF PREFERRED EMBODIMENTS

Figure 1:
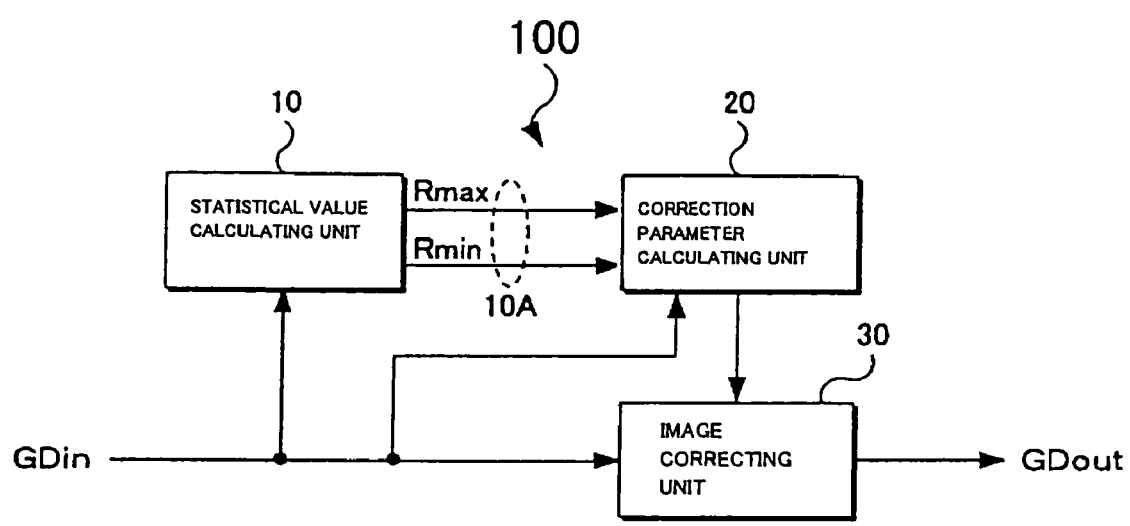
FIG. 1 is an exemplary block diagram illustrating the structure of an image processing device according to a first embodiment of the present invention.

An embodiment of an image processing device according to the present invention will now be described with reference to drawings. FIG. 1 is an exemplary block diagram illustrating the structure of an image processing device according to a first embodiment. Input image data GDin is supplied to an image processing device 100. The input image data GDin represents gray-scale values to be displayed on individual pixels constituting one screen. The input image data GDin according to the present embodiment is moving image data of eight bits per a pixel. Therefore, the input image data GDin represents 256 gray-scale levels. The minimum value is '0' and the maximum value is '255'. The image processing device 100 performs statistical processing on the input image data GDin to generate the statistical values and performs correction processing on the input image data GDin using the statistical values to generate output image data GDout.

Figure 2:
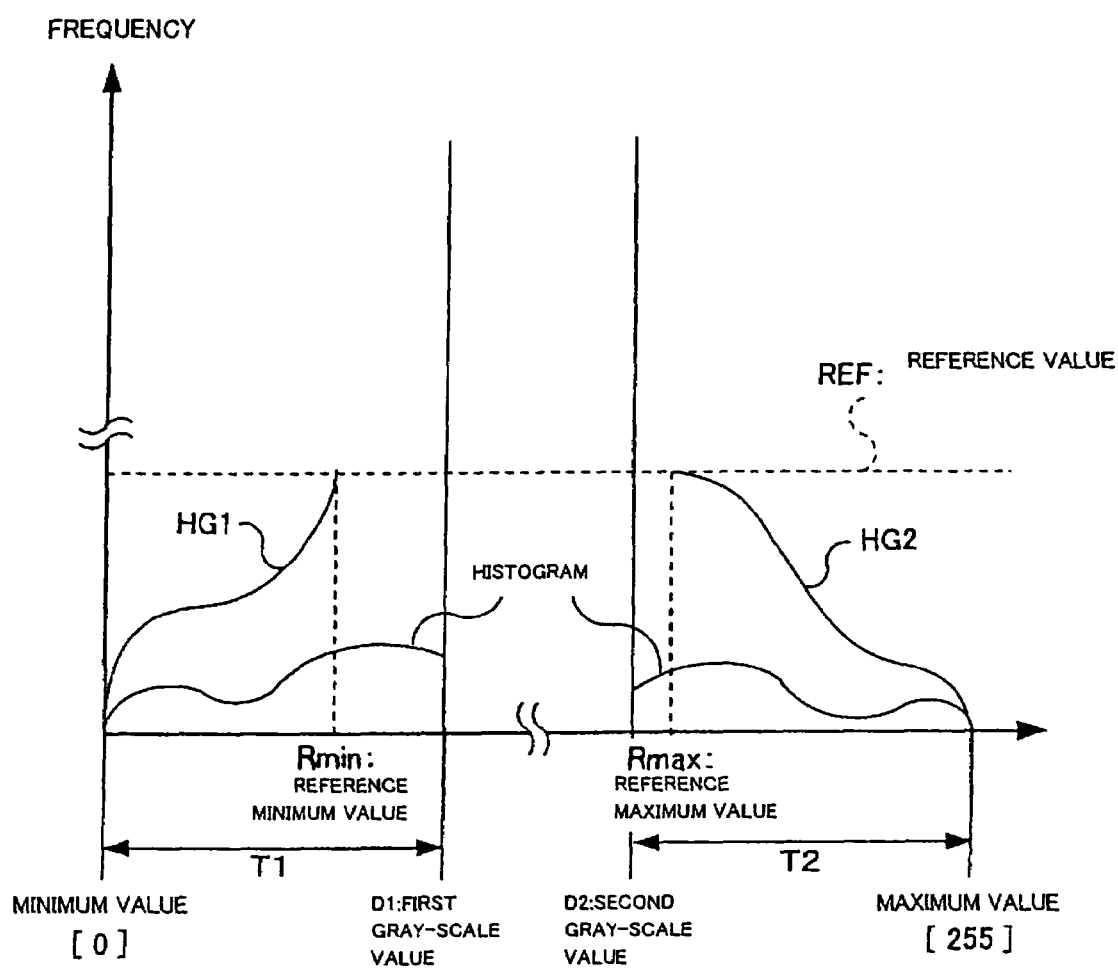
FIG. 2 schematically illustrates a statistical calculation process.

The image processing device 100 can include a statistical value calculating unit 10, a correction parameter calculating unit 20, and an image correcting unit 30. The statistical value calculating unit 10 performs a predetermined statistical processing on the input image data GDin, thereby generating statistical value data 10A. The statistical calculation processing is schematically described with reference to FIG. 2. According to the statistical calculation processing, accumulative histograms HG1 and HG2 are generated directly in both directions in a first range T1 from the minimum value (0) to a first gray-scale value D1 and in a second range T2 from the maximum value (255) to a second gray-scale value D2. Points at which the frequencies of the generated accumulative histograms HG1 and HG2 reach a predetermined reference value REF are specified as a reference minimum value Rmin and a reference maximum value Rmax, thereby generating the statistical value data 10A which represents the reference minimum value Rmin and the reference maximum value Rmax. Furthermore, the second gray-scale value D2 is larger than the first gray-scale value D1.

The accumulative histogram represents the frequency obtained by gathering the frequencies of the histogram in a predetermined direction (a direction from the minimum value to the maximum value or from the maximum value to the minimum value) at each level.

The width of a level can be arbitrarily determined. However, the width of the level according to the present embodiment is one gray-scale level. According to the present embodiment, two kinds of accumulative histograms are simultaneously generated. That is, the accumulative histogram HG1 from the minimum value to the first gray-scale value D1 and the accumulative histogram HG2 from the maximum value to the second gray-scale value D2 are generated.

The correction parameter calculating unit 20 generates a look-up table LUT based on the statistical value data 10A. The respective gray-scale values of the input image data GDin and the respective corrected gray-scale values corresponding to the gray-scale values of the input image data GDin are stored in the look-up table LUT. The stored contents are updated based on the statistical value data 10A. The image correcting unit 30 generates the output image data GDout with reference to the look-up table LUT. To be specific, the image correcting unit 30 reads the gray-scale values of the input image data GDin, use them as addresses to access the look-up table LUT, and outputs the gray-scale values read from the look-up table LUT as the output image data GDout.

FIG. 3 illustrates a detailed structure of the correction parameter calculating unit 20. The correction parameter calculating unit 20 includes a scene detecting unit 21, a calculating unit 22, a LUT generating unit 23, and a look-up table LUT.

The scene detecting unit 21 detects change in the scene from frame to frame based on the input image data GDin and generates the detection signal SE that is at a high level when change occurs in the scene and is at a low level when no change occurs in the scene. Change in the scene may be detected based on the correlation of the images from frame to frame. For example, a difference value between the average brightness of the current frame and the average brightness of a frame prior to the current frame by one frame is calculated. When the difference value is larger than a predetermined reference value, it is detected that change occurs in the scene. When the difference value is no more than the reference value, it is detected that no change occurs in the scene. Whether change occurs in the scene may be detected based on any statistical values other than the average brightness.

The calculating unit 22 includes a first cyclic filter F1 and a second cyclic filter F2. The cyclic filters F1 and F2, which operate as low pass filters, prevent the occurrence of rapid changes in the reference minimum value Rmin and the reference maximum value Rmax, thereby generating a correction parameter P. The first cyclic filter F1 includes a first counter 221, a second counter 222, an adder 223, and a memory 224. The second cyclic filter F2 has the same structure as that of the first cyclic filter F1. Therefore, a detailed description of the second cyclic filter F2 is omitted.

The first counter 221, which includes a multiplication circuit, multiplies the reference minimum value Rmin by a first coefficient A and outputs the multiplication result to the adder 223. The second counter 222, which includes a multiplication circuit, multiplies a correction parameter P(n−1) of the frame prior to the current by one frame by a second coefficient B and outputs the multiplication result to the adder 223. The adder 223 adds the output signal of the first counter 221 to the output signal of the second counter 222 and generates a correction parameter P(n). The memory 224, which operates as a device for delaying by one frame, stores the correction parameter P(n) and outputs the correction parameter P(n) to the next frame. Therefore, the correction parameter P(n−1) of the frame prior to the current frame by one frame is output from the memory 224.

According to the above structure, the correction parameter P(n) of the current frame is obtained by the following equation.

$$P(n)=A*S(n)+B*P(n-1) \text{ and } 1=A+B$$

The reference minimum value Rmin of the current frame is S(n) and the correction parameter of the frame prior to the current frame by one frame is P(n−1).

The values of the first coefficient A and the second coefficient B are selected based on the detection signal SE. For example, when the detection signal SE is at the low level (when no change occurs in the scene), A=B=½. When the detection signal SE is at the high level (when change occurs in the scene), A=1 and B=0. In other words, when it is detected that change occurs in the scene, it is preferable to generate the correction parameter P by performing calculations in which the weighting on the reference minimum value Rmin (the statistical value data 10A) of a previous frame is smaller than in a case where no change occurs in the scene.

Figure 4A:
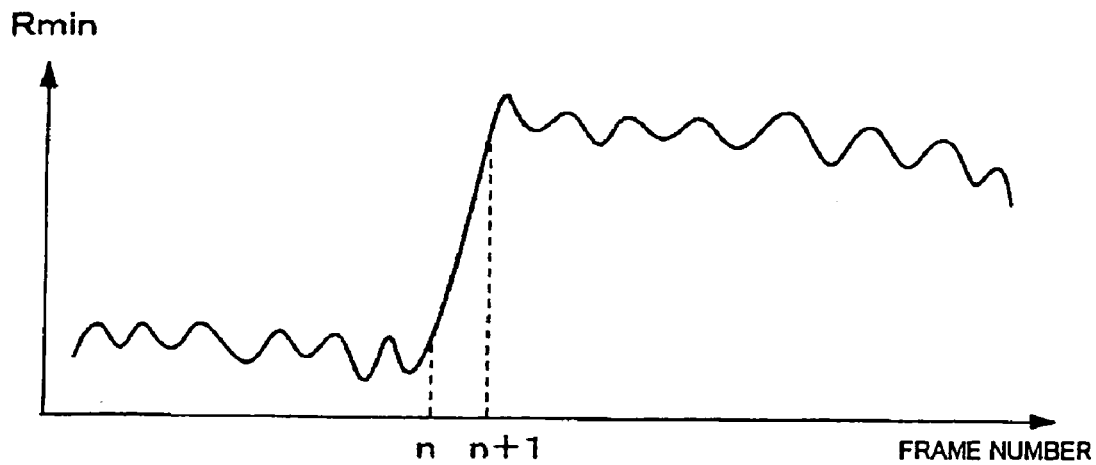
FIG. 4 illustrates an operation of a first cyclic filter F1.

FIG. 4 illustrates examples of input-output characteristics of the first cyclic filter F1. Assuming that its reference minimum value Rmin changes as illustrated in FIG. 4(A), according to the present examples, a high frequency component having a small amplitude is included in the reference minimum value Rmin. The value of the reference minimum value Rmin significantly changes between an n-th frame and an (n+1)-th frame. When moving images are corrected, if the correction parameter P changes with a short period, flickering occurs on the screen when the moving images are viewed.

Figure 4B:
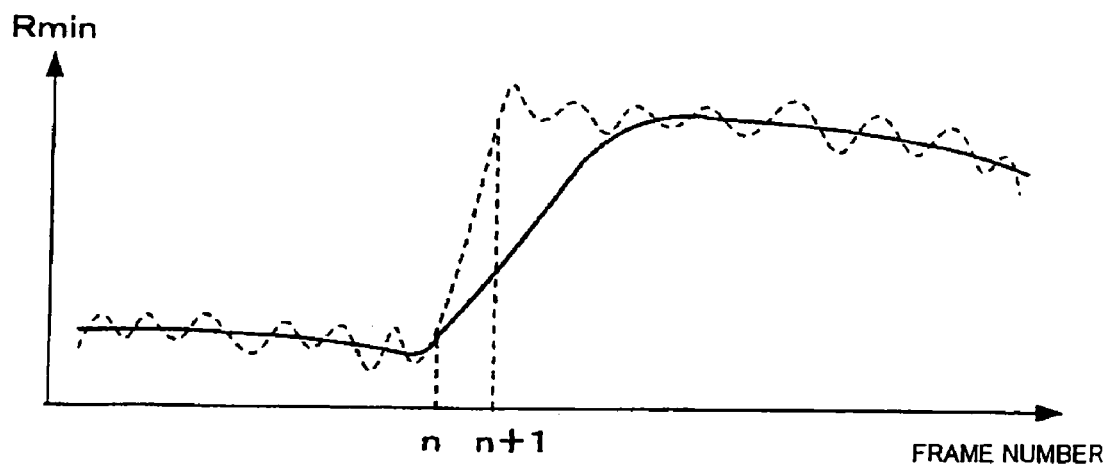

When the values of the first coefficient A and the second coefficient B are fixed, regardless of whether change occurs in the scene, the output of the first cyclic filter F1 is illustrated in FIG. 4(B). In this case, it is possible to remove the high frequency component having the small amplitude that overlaps the reference minimum value Rmin. However, a response delay occurs between the n-th frame and the (n+1)-th frame, in which change occurs in the scene.

Figure 4C:
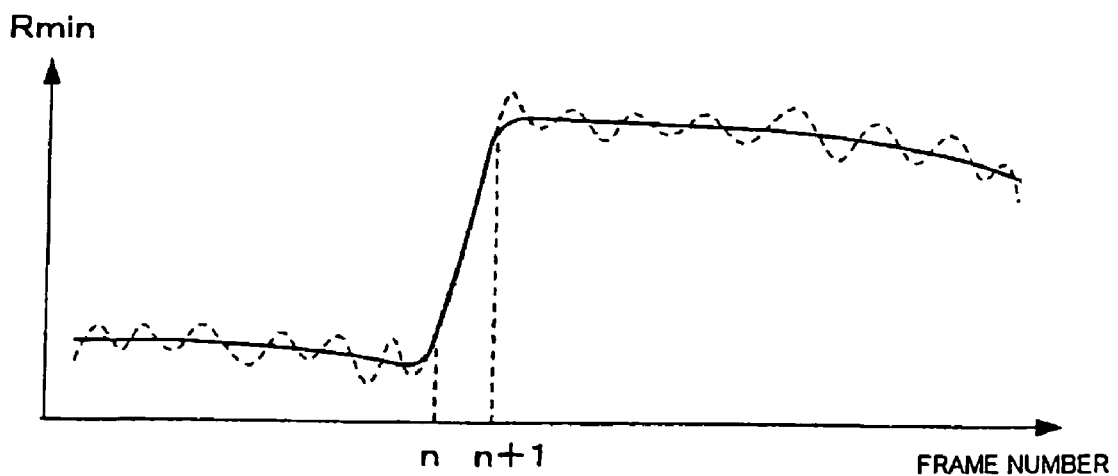

According to the present embodiment, the first coefficient A and the second coefficient B change in accordance with whether change occurs in the scene. Therefore, the output of the first cyclic low pass filter F1 is illustrated in FIG. 4(C). The high frequency component having the small amplitude, which overlaps the reference minimum value Rmin, is removed thereby improving the response characteristics significantly. As a result, it is possible to display clear images when the scene changes.

The LUT generating unit 23 illustrated in FIG. 3 stores predetermined data in the look-up table LUT based on the correction parameter P output from the calculating unit 22. The correction parameter P includes a corrected reference minimum value Rmin' output from the first cyclic filter F1 and a corrected reference minimum value Rmax' output from the second cyclic filter F1.

Figure 5A:
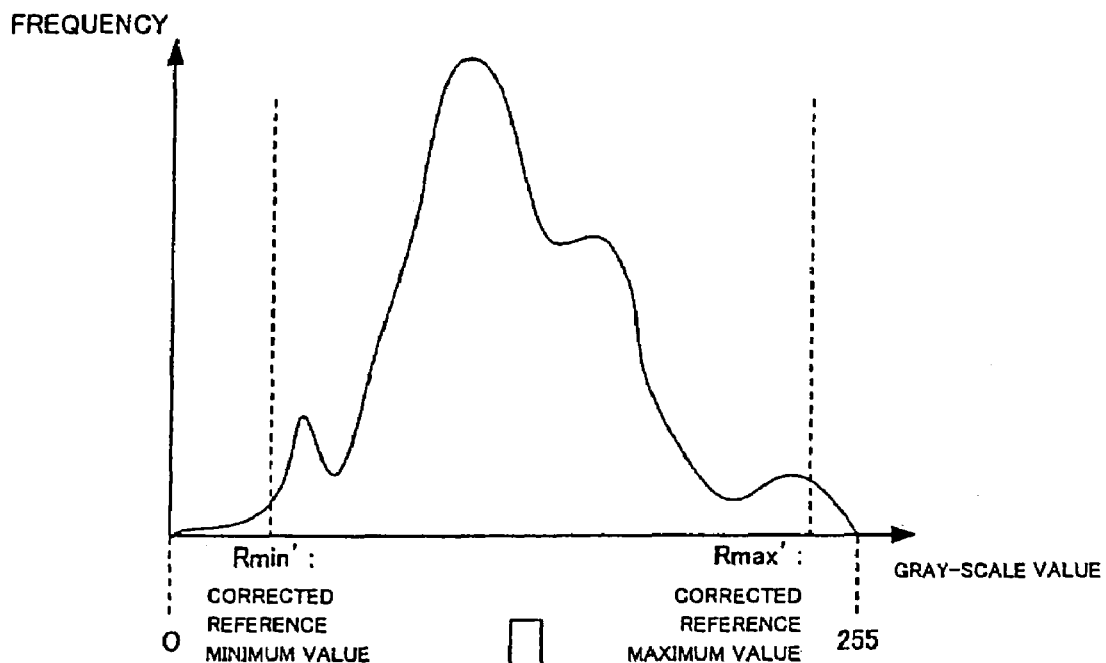
FIG. 5 illustrates image correction processing based on statistic data 10A.
Figure 5B:
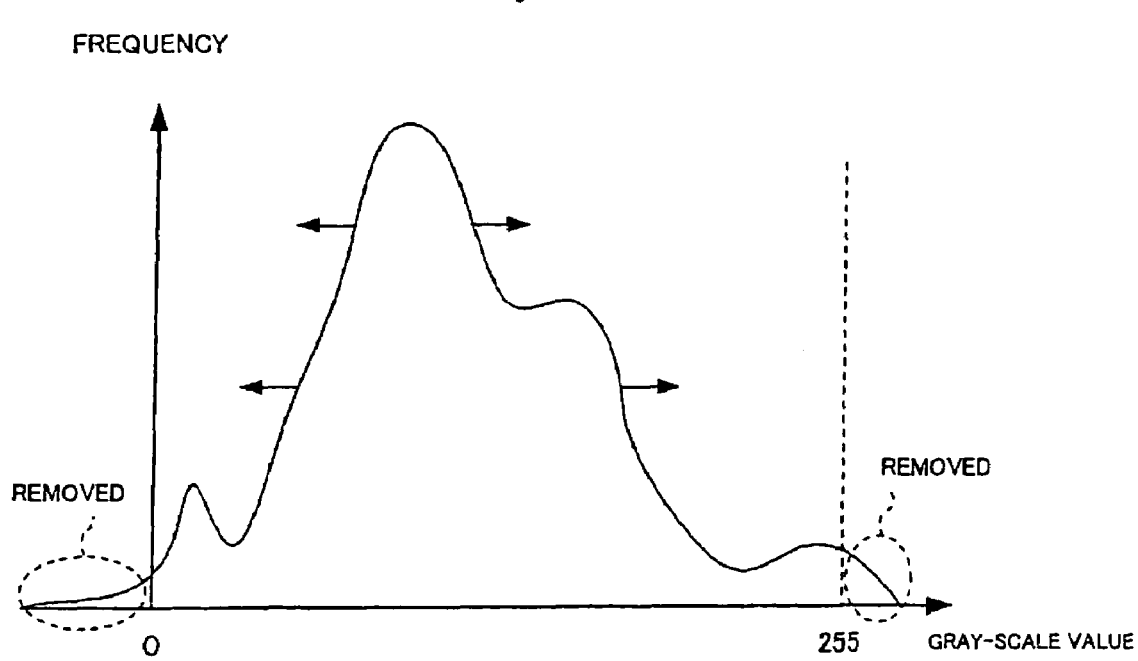

Image correction processing based on the correction parameter P will be described with reference to examples illustrated in FIG. 5. For example, the gray-scale values of the input image data GDin of one screen are distributed as illustrated in the histogram of FIG. 5(A). Therefore, it is possible to obtain the reference minimum value Rmin and the reference maximum value Rmax by performing the above-mentioned statistic calculations. In this case, as illustrated in FIG. 5(B), the image correcting unit 30 removes the shaded portion in which the gray-scale values are smaller than the reference minimum value Rmin and the highlighted portion in which the gray-scale values are larger than the reference maximum value Rmax.

Therefore, the correction parameter calculating unit 20 generates the look-up table LUT so that the minimum value of the output image data GDout is the corrected reference minimum value Rmin' and the maximum value thereof is the corrected reference maximum value Rmax'. To be specific, the correction parameter calculating unit 20 generates the look-up table LUT so that the input-output gray-scale characteristics of the image correction processing are described by the equations below.

$$GDout=fa*GDin-fb$$

$$fa=256/(Rmax'-Rmin')$$

$$fb=fa*Rmin$$

Furthermore, fa is the slope of the input-output gray-scale characteristics and fb is the intercept of the input-output gray-scale characteristics.

Figure 6:
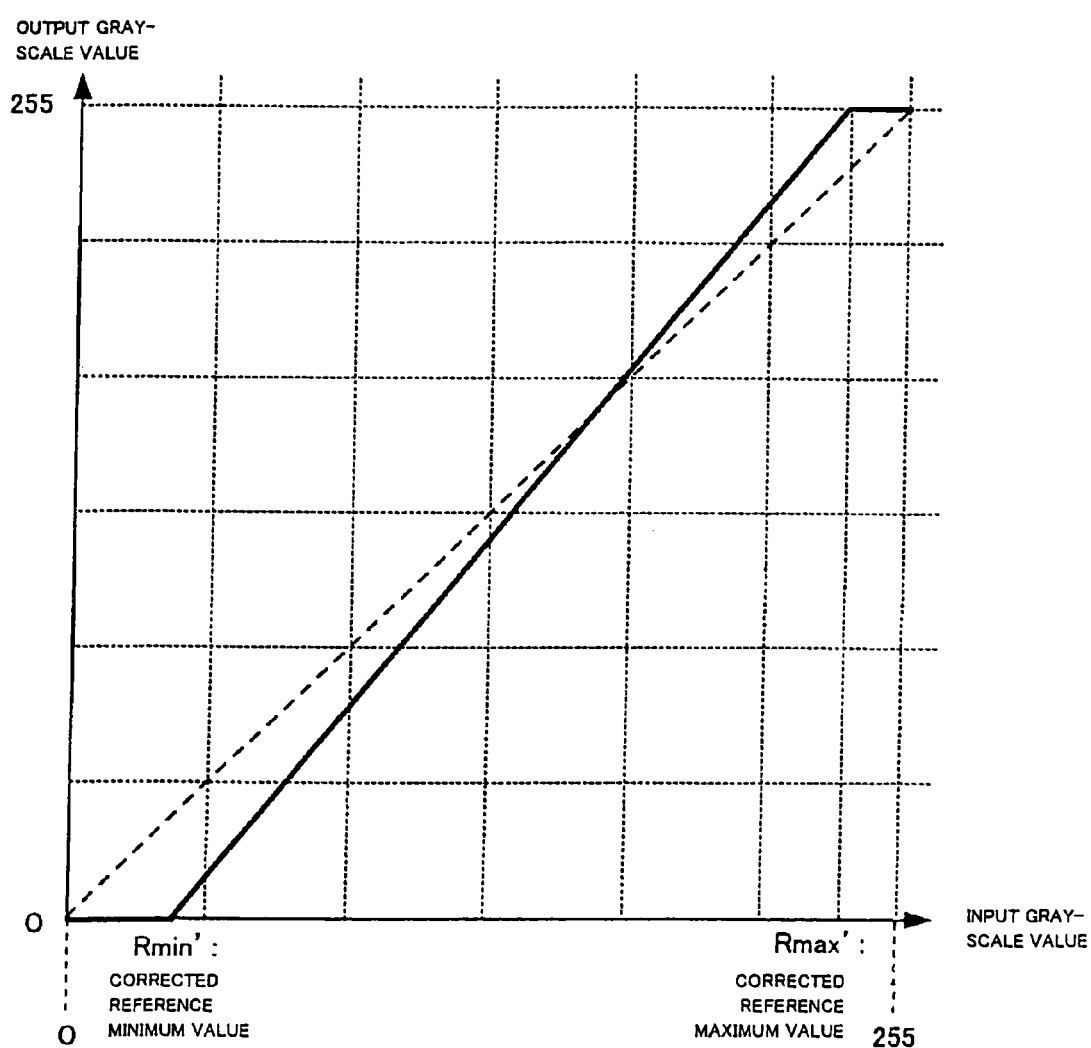
FIG. 6 is a graph illustrating an example of contents stored in a look-up table LUT used for the above-mentioned embodiment.

FIG. 6 illustrates an example of the contents stored in the look-up table LUT. In FIG. 6, a dotted line illustrates the input-output gray-scale characteristics when the image correction processing is not performed. A solid line illustrates the input-output gray-scale characteristics when the image correction processing is performed. As illustrated in FIG. 6, the gray-scale value of the output image data GDout is the minimum value '0' when the gray-scale value of the input image data GDin is in the range from the minimum value '0' to the corrected reference minimum value Rmin'. The gray-scale value of the output image data GDout is the maximum value '255' when the gray-scale value of the input image data GDin is in the range from the maximum value '255' to the corrected reference maximum value Rmax'. Therefore, the shaded portion and the highlighted portion are removed and the entire gray-scale is enlarged in the direction of the arrows illustrated in FIG. 6.

As mentioned above, according to the present embodiment, since the high-frequency components are removed from the statistical values, such as the reference minimum value Rmin and the reference maximum value Rmax, it is possible to significantly simplify the structure of the image processing device compared with a case where the high-frequency components are removed during generating a histogram which is a source for obtaining the statistical values and thereby reduce the processing load. Furthermore, since the time constant of the low pass filter is changed according to whether change occurs in the scene, it is possible to immediately perform appropriate image correction when scenes change.

An image processing device according to a second embodiment of the present invention will now be described. The image processing device according to the second embodiment is the same as the image processing device 100 according to the first embodiment illustrated in FIG. 1 excluding a calculating unit 22' which is used instead of the calculating unit 22.

Figure 7:
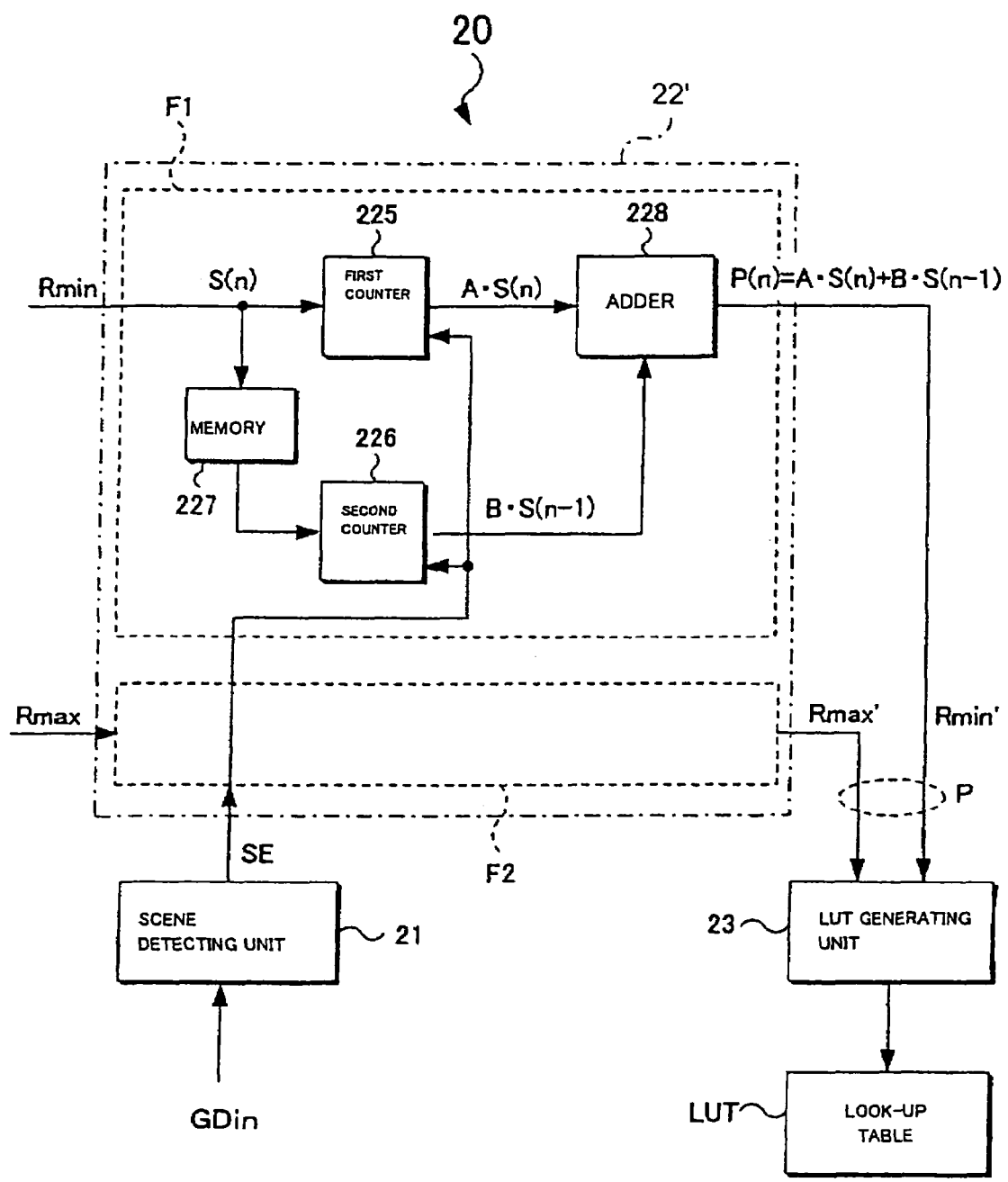
FIG. 7 is an exemplary block diagram illustrating the structure of a correction parameter calculating unit 20' used for a second embodiment of the present invention.

FIG. 7 is a block diagram illustrating a detailed structure of the correction parameter calculating unit 20 according to the second embodiment. The same elements as those illustrated in FIG. 3 are denoted by the same reference numerals. The calculating unit 22' according to the present embodiment includes a first low pass filter f1 and a second low pass filter f2. The first and second low pass filters f1 and f2 prevent occurrence of rapid changes in the reference minimum value Rmin and the reference maximum value Rmax thereby generating the correction parameter P. The first low pass filter f1 includes a first counter 225, a second counter 226, an adder 228, and a memory 227. Furthermore, since the structure of the second low pass filter f2 is the same as that of the first low pass filter f1, the detailed description of the second low pass filter f2 is omitted.

The memory 227 stores the reference minimum value Rmin of a frame prior to the current frame by one frame. When the reference minimum value Rmin of the current frame is S(n) and the reference minimum value Rmin of the frame prior to the current frame by one frame is S(n−1), the correction parameter P(n) of the current frame is obtained by the following equations.

$$P(n)=A*S(n)+B*S(n-1) \text{ and } 1=A+B$$

The values of the first coefficient A and the second coefficient B are selected based on the detection signal SE as illustrated in the first embodiment. For example, when the detection signal SE is at the low level (when no change occurs in the scene), $A=B=\frac{1}{2}$. When the detection signal SE is at the high level (when change occurs in the scene), $A=1$ and $B=0$. When no change occurs in the scene, it is possible to generate the correction parameter P based on the average value of the reference minimum value Rmin of the plurality of frames. When change occurs in the scene, it is possible to output the reference minimum value Rmin of the current frame as the correction parameter P.

As mentioned above, like in the first embodiment, in the second embodiment, since the high-frequency components are removed from the statistical values such as the reference minimum value Rmin and the reference maximum value Rmax, it is possible to significantly simplify the structure of the image processing device compared with the case where the high-frequency components are removed in the process of generating the histogram, which is the source for obtaining the statistical values, and thereby reduce the processing load. Furthermore, since the time constant of the low pass filter is changed according to whether change occurs in the scene, it is possible to immediately perform appropriate image correction when scenes change.

Furthermore, it should be understood that the present invention is not limited to the first and second embodiments. For example, the following modifications can be made.

According to the above-mentioned embodiments, the first coefficient A and the second coefficient B when no change occurs in the scene may change in accordance with the frame rate of the input image data GDin. For example, as illustrated in FIG. 8, the degree of equalization may increase by increasing the time constant of the low pass filter as the frame rate is reduced. This is because the difference value of the statistical value data 10A from frame to frame increases since the correlation from frame to frame is reduced when the frame rate is reduced.

According to the above-mentioned embodiments, a process in the correction parameter calculating unit 20 is performed by hardware, however, it may also be performed by software. In this case, the CPU is preferably operated by a predetermined image processing program.

The above-mentioned embodiments are preferably used for electronic apparatuses having liquid crystal panels, electroluminescent (EL) panels, digital micro mirror device (DMD) panels, and various electro-optical panels using fluorescence caused by plasma light emission or electron emission. In this case, the electronic apparatus includes a timing signal generating circuit for generating a control signal to control an electro-optical panel based on the output image data GDout, an image signal generating circuit for generating an image signal supplied from the output image data GDout to the electro-optical panel, a driving circuit for driving the electro-optical panel, and the electro-optical panel. The electronic apparatuses are, for example, mobile personal computers, mobile telephones, televisions, view finder type or monitor direct view type video tape recorders, car navigation devices, pagers, electronic organizers, calculating units, word processors, work stations, picture telephones, POS terminals, and devices having touch panels.

Thus, while this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. An image processing device for performing image processing on image data, the image processing device comprising:

a statistical value calculating device that performs statistical processing on the image data to generate statistical value data representing statistical values;

a scene detecting device that detects whether a change occurs in a scene based on the image data;

a correction parameter calculating device that weights the statistical value data of a plurality of frames in accordance with the detection result by the scene detecting device to calculate a correction parameter; and an image correcting device that performs image correction processing on the image data based on the correction parameter, wherein, when it is detected that no change occurs in the scene, the correction parameter calculating device calculate a correction parameter P(n) of a current frame in accordance with the equations: $P(n)=A*S(n)+B*P(n-1)$ and $1=A+B$, where $S(n)$ is statistical value data of a current frame, $P(n-1)$ is a correction parameter of a frame prior to the current frame by one frame, A is a first coefficient, and B is a second coefficient.

2. The image processing device according to claim 1, wherein, when it is detected by the scene detecting device that a change occurs in the scene, the correction parameter calculating device generates a correction parameter by performing calculations in which the weighting on statistical value data of a previous frame is smaller than in a case where no change occurs in the scene.

3. The image processing device according to claim 1, wherein, when it is detected by the scene detecting device that no change occurs in the scene, the correction parameter calculating device calculates an average of statistical value data of the plurality of frames to generate the correction parameter.

4. The image processing device according to claim 3, wherein, when it is detected by the scene detecting device that a change occurs in the scene, the correction parameter calculating device generates statistical value data of the current frame as the correction parameter.

5. The image processing device according to claim 1, wherein, when it is detected by the scene detecting device that a change occurs in the scene, the correction parameter calculating device makes A equal to 1 and B equal to 0.

6. The image processing device according to claim 1, the correction parameter calculating device detecting a frame rate of the image data and weighting the statistical value data of the plurality of frames based on the detected frame rate and the detection result by the scene detecting device to calculate a correction parameter.

7. An image processing method of performing image processing on image data, the method comprising:
performing statistical processing on the image data to generate statistical value data representing statistical values;
detecting whether a change occurs in a scene based on the image data;
calculating a correction parameter by weighting the statistical value data of a plurality of frames in accordance with the result of detecting scenes;
performing image correction processing on the image data based on the correction parameter; and
when it is detected that no change occurs in the scene, calculating $P(n)$ of a current frame in accordance with the equations: $P(n)=A*S(n)+B*P(n-1)$ and $1=A+B$, where $S(n)$ is statistical value data of a current frame, $P(n-1)$ is a correction parameter of a frame prior to the current frame by one frame, A is a first coefficient, and B is a second coefficient.

8. The image processing method according to claim 7, calculating the correction parameter further comprising, when it is detected that a change occurs in the scene, generating the correction parameter by performing calculations in which the weighting on statistical value data of a previous frame is smaller than in a case where no change occurs in the scene.

* * * * *